Patented Sept. 26, 1939

2,174,247

UNITED STATES PATENT OFFICE 2,174,247

PROCESS FOR THE POLYMERIZATION OF OLEFINS

Sumner H. McAllister, Lafayette, Calif., assignor to Shell Development Company, San Francisco, Calif., a corporation of Delaware No Drawing. Application March 26, 1937, Serial No. 133,203

11 Claims. (Cl. 260—683)

This invention relates to the manufacture of olefin polymers, and, more specifically, is concerned with a method wherein olefins are polymerized by contact with strong mineral acids without resort to a separate step of olefin absorption.

An important object of my invention is the provision of a process whereby the yield of polymers of desired characteristics from a given olefinic mixture can be materially increased. The process has special advantages in the manufacture of anti-knock motor fuels, for example, since by its use a gasoline can be produced having a higher octane rating than is obtainable by polymerization of the same amounts of the same starting olefins by prior methods.

In order that the scope of my invention be fully comprehended, the following terminology is defined:

Tertiary olefins are those olefins which contain an unsaturated tertiary carbon atom

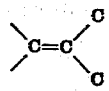

initially or those, like isopropyl ethylene, which isomerize in the presence of strong mineral acids to such a form. Secondary olefins are normal or iso-olefins, other than ethylene, containing the group —CH=CH—. The intermolecular combination of like olefin molecules is termed copolymerization while the combination of unlike olefins, for example, the reaction of a tertiary with a secondary olefin or of a copolymer of either with a different olefin will be referred to as conjunct polymerization.

I have found that tertiary olefins may be reacted with secondary olefins and/or other tertiary olefins to give high yields of conjunct polymers by heating mixtures of such olefins with aqueous mineral acids. While some copolymerization may accompany this reaction in the process of my invention, it leads to a commercially practical method for materially increasing the yield of olefin polymers from mixtures containing both tertiary and secondary olefins. My process is simple, may be carried out in readily available equipment and is easily controlled, particularly with respect to the degree of polymerization obtainable. It may be carried out in many different ways.

For the purpose of making my invention clear it will be described with more particular reference to the manufacture of octenes from butane-butylene fractions obtainable from the products of petroleum cracking, using aqueous sulfuric acid as the polymerizing agent. It will be understood, however, that this is merely for purposes of illustration and implies no limitation on my invention as the same, or equivalent, procedures may be used for the polymerization of other mixtures containing tertiary and secondary olefins regardless of the source or other constituents of the mixture. Thus, tertiary olefins which may be present in the mixtures which may be used in the process of my invention include, in addition to isobutylene, trimethylethylene, unsymmetrical methyl ethyl ethylene, tetramethylethylene and the like while typical secondary olefins which may be present therewith are, for example, propylene, α and β butylene, α and β amylene, 2-methyl pentene-4, etc. The olefins may be used in a pure state as mixtures of one or more tertiary olefin with one or more secondary olefins or such mixtures containing other components such, for example, as paraffins and/or diolefins, etc., may be used. Particularly suitable are hydrocarbon fractions consisting of, or predominating in, hydrocarbons containing the same number of carbon atoms to the molecule altho nonisomeric mixtures containing tertiary and secondary olefins may also be used. Furthermore instead of sulfuric acid, other suitable strong mineral acids, such as phosphoric, benzene sulfonic, and like acids, for example, or their mixtures may be employed as polymerizing agent.

One simple method of carrying out the conjunct polymerization process of my invention comprises contacting a preheated butane-butylene fraction containing isobutylene and α and β butylenes, for example, with 55 to 80% sulfuric acid, in a mixing pump which feeds to a separator in which the reaction mixture is stratified, the acid layer being returned to the pump while the hydrocarbon layer is fractionated for separation of polymers from unreacted hydrocarbons, etc. The process is preferably carried out under sufficient pressure to maintain the butylenes substantially in the liquid state for which purpose about 300 pounds pressure is ample, when the reaction is carried out in the preferred range of about 80° C. to about 120° C. Typical of the results obtainable by this procedure are the following:

Example I

Composition of feed, weight per cent:
- Isobutylene _____ 18.5
- α and β butylenes _____ 28.2
- Butanes _____ 53.3

Sulfuric acid concentration ____ per cent __ 69.6
Molal ratio acid to olefin in mixer _____ 0.51
Pressure, lbs./sq. in. gauge _____ 290–310
Temperature of mixer _____ °C __ 100
Average contact time _____ minutes __ 10

Composition of product, weight per cent:
- Isobutylene _____ 0.1
- α and β butylenes _____ 15.5
- Butanes _____ 53.3
- Polymers _____ 31.1

Per cent isobutylene reacted _____ 99.5
Per cent α and β butylenes reacted _____ 45.1
Weight per cent octenes in polymer _____ 86.8
Octane rating of hydrogenated dimer _____ 99.6

By recycling the unreacted secondary olefins after removal of the polymer, higher conversions may be obtained, as a high ratio of secondary olefins to tertiary olefins is conducive to more extensive conjunct polymerization. Using the same mixer as in the foregoing example, but recycling a volume of exit hydrocarbon equal to that of the feed the following results were obtained.

Example II

Composition of feed, weight per cent:
- Isobutylene _____ 18.5
- α and β butylenes _____ 28.0
- Butanes _____ 53.5

Sulfuric acid concentration _____ per cent __ 70.0
Mol ratio acid to olefin in mixer _____ 0.43
Pressure, lbs./sq. in. gauge _____ 300
Temperature of mixer _____ °C __ 100
Average contact time _____ minutes __ 10

Composition of product, weight per cent:
- Isobutylene _____ 0.0
- α and β butylenes _____ 9.5
- Butanes _____ 53.5
- Polymer _____ 37.0

Per cent reacted, based on feed:
- Isobutylene _____ per cent __ 100
- α and β butylenes _____ do ____ 64.8

Weight per cent of octenes in polymer _____ 88.6
Octane rating of hydrogenated dimer _____ 99.1

The use of a mixer pump as described in Examples I and II is particularly advantageous in that the ratio of tertiary olefins to secondary olefins in the mixer tends to be lower than that in the feed due to constant dilution of the mixture with fresh feed thus promoting conjunct polymerization. It also has the advantage of promoting intimate mixing of acid and olefins which is desirable for rapid and easily controlled polymerization. The conjunct polymerization of my invention may, however, be carried out in other types of apparatus. For example, the mixer may be replaced by a packed tower or other suitable contacting means. When using a tower type of reactor, a jet mixer, for example of the Venturi type, may be attached at the top to intimately mix the returned acid and hydrocarbon feed which may as before be either fresh hydrocarbon alone or such hydrocarbon mixed with recycled unreacted secondary olefins. By filling the tower with glass or porcelain chips or other inert packing, the degree of mixing may be increased and as preferably the flow is downward, there is no accumulation of acid in the system. The tower may advantageously be suitably heated in order to maintain the desired reaction temperature. This method of operation has the advantage of eliminating corrosion of the moving parts of mixers, etc., and reduces the cost of the equipment. The capacity of a given reactor, whether of the tower or mixer or other suitable type, may be increased by providing suitable waiting tanks in which stratification is substantially avoided while providing additional reaction time. In order to promote intimate contact between acid and olefinic mixture, mixers provided with waiting tanks may be operated in series, it usually being unnecessary in such cases to apply heat in the second polymerization stage. An advantageous alternative procedure to that described in Example II for the recycling of unreacted olefins comprises returning to the mixer along with fresh hydrocarbon and separated acid, a part of the emulsified reaction product before stratification. In the case of series operation of two or more mixers the recirculation of emulsion is preferably from the last to the first stage.

Whatever method of operation is adopted, I find it preferable in carrying out the conjunct polymerization of isobutylene with secondary butylenes for the production of octenes to use sulfuric acid of about 55 to 75% concentration and more preferably of 63 to 72% concentration, at temperatures of about 120 to about 70° C. and more preferably of about 105° to 80° C. The upper limit of both acid concentration and temperature is set by $SO_2$ formation which not only increases corrosion difficulties but also introduces impurities into the polymer which are difficult to remove, interfere with its hydrogenation and are otherwise objectionable. By using mixtures of phosphoric acid and/or phosphates, such, for example, as sodium acid phosphate, and the like, in suitable proportions such for example, as about 5 to 25%, with the sulfuric acid, the formation of $SO_2$ may be effectively inhibited, however. In all cases I prefer to avoid excessive temperatures as these necessitate the use of very high pressures to maintain the olefins in the liquid state and this unduly increases the cost of the equipment. Sulfuric acid of below 63% is more corrosive than sulfuric acid of higher effective concentrations, but very concentrated acid of 80% or above tends to increase the higher polymer content of the product at the expense of octene production. I therefore prefer to operate in the specified preferred ranges using the higher temperatures with acid of lower concentrations and vice versa.

Other things being equal, the longer the contact time the greater the amount of reaction. With stronger acids and higher temperatures the influence of time is less marked than under milder conditions, however. Thus in operations at about 100° C. with 70% sulfuric acid there is very little difference in the amount of isobutylene and secondary butylenes reacted or in the amount of octenes in the product at reaction times of about 3 to 10 minutes. With 65% acid on the other hand the amount of secondary olefins reacted continues to increase noticeably as the contact time at about 100° C. is increased to about 13 minutes. A maximum reaction efficiency corresponds to maximum production of conjunct polymers and I generally prefer not to extend the reaction period much beyond that necessary for the polymerization of equal amounts of tertiary and secondary olefins.

The effect of increasing the ratio of acid to olefins present is, up to a certain point which varies with the acid concentration and temperature, to accelerate the reaction. Very low molar ratios of sulfuric acid to butylenes, for example, lower than about 0.25 to 1 are preferably not used with sulfuric acid of 65% at 80° C., or similar mild conditions, as the conjunct polymerization reaction is decreased thereby. Nor do I find any practical advantage usually in using a higher ratio than about 2.5 to 1. At higher temperatures and with stronger acid the influence of acid to olefin ratio is less than that produced under milder conditions.

It is thus evident that my process is quite flexible and that by proper adjustment of the factors of acid concentration, temperature, time of contact and ratio of acid to olefin within the following ranges, high yields of butene dimers may be obtained in a simple manner.

Sulfuric acid concentration
   per cent__55 to 80 or preferably 63 to 72
Temperature
   °C__120 to 70 or preferably 105 to 80
Time of contact
   minutes__1 to 25 or preferably 3 to 13
Molar ratio $H_2SO_4$ to butenes
   2.5 to 0.25 or preferably 1.5 to 0.5

Another factor which may be regulated to promote the formation of dimers by which I mean polymers composed of two molecules of starting olefin whether like olefins or, as in conjunct polymerization, unlike olefins instead of higher polymerization products, is the inert hydrocarbon content. This may be varied by direct addition of hydrocarbon to the reaction mixture or by recycling inert hydrocarbon recovered from the reaction products whether containing unreacted olefins or not. Suitable hydrocarbons which are inert under the conditions of the reaction are for example, paraffins, aromatics such as benzene, etc., saturated carbocyclic compounds, and the like. Most preferably inert hydrocarbons which are easily removed from the desired polymerization product by distillation are used when resort is had to direct addition of hydrocarbon. I prefer not to use hydrocarbons boiling at temperatures lower than that of the olefins being treated, however, as the pressure required to maintain the system substantially in the liquid phase is increased thereby. In some cases it is permissible to use hydrocarbons of about the same boiling range as that of the product as for example, where polymers are being manufactured for blending with gasoline to increase its octane rating, the gasoline, in part or in whole, may be added as the desired hydrocarbon. The effect of the inert hydrocarbon, whether initially present or added or both, appears to be that of a solvent for, or diluent of, the polymer formed so that there is less contact of polymer with acid after the dimer stage is reached than in the absence of such inert hydrocarbon and consequently the yields of dimer are increased thru suppression of the reaction of dimer with mono-olefins and/or other dimers to produce higher polymerization products.

For the production of conjunct polymers by the process of my invention it is advantageous to have a substantial amount of tertiary olefin present also preferably at least as many mols of secondary olefin present as there are mols of tertiary olefin and more preferably, as has already been pointed out, an excess of secondary olefins over tertiary olefins, for example, about 1.5 to about 5.0 mols of secondary butylenes per mol of isobutylene. When the amount of secondary olefins present is very small the reaction is almost exclusively copolymerization of isobutylene while with excessive ratios of secondary olefins the conversion is very low even when very long contact times and very drastic conditions are used, as shown by the following tests carried out in the same apparatus used in Example I.

*Example III*

| Composition of feed, weight per cent: | | |
|---|---|---|
| Isobutylene | 18.5 | 1.2 |
| α and β butylenes | 28.0 | 33.3 |
| Butanes | 53.5 | 65.5 |
| Sulfuric acid concentration | 79.3 | 79.6 |
| Molal ratio acid to olefins in mixer | 0.52 | 0.66 |
| Pressure, lbs./sq. in., gauge | 300 | 300 |
| Temperature of mixer, average °C. | 104 | 109 |
| Average contact time____minutes__ | 25 | 18 |
| Compositon of product, weight per cent: | | |
| Isobutylene | 0.1 | 0.1 |
| α and β butylene | 7.0 | 23.8 |
| Butanes | 53.5 | 65.5 |
| Polymers | 39.4 | 10.6 |
| Per cent isobutylene reacted | 99.4 | 91.6 |
| Per cent α and β butylene reacted | 75.0 | 28.5 |

Depending upon conditions, more or less copolymerization may accompany the conjunct polymerization in the process of my invention, but I preferably regulate the reaction, as described, so that substantial conjunct polymerization is effected as in this manner not only are higher yields of suitable products obtained but also higher conversions per unit volume of reactor space are obtained. It is thus evident that the process of my invention offers many advantages over prior methods of polymerizing olefins. It eliminates entirely the olefin absorption step formerly thought to be essential in order to obtain high dimer yields, yet produces even higher proportions of dimers. It permits the conversion of both tertiary and secondary olefins to valuable polymerization products without resort to the use of solid catalysts which are subject to poisoning and deterioration and which require high temperatures with attendant control difficulties. In the manufacture of anti-knock gasoline, the process of my invention yields more octane gallons (i. e. gallons of product multiplied by its octane number, before or after hydrogenation) than are obtainable by processing the same olefins by other known methods. This is believed to be due to the fact that it employs relatively less drastic conditions than prior methods such for example, as vapor phase polymerization with solid catalysts which encounter serious difficulty from undesirable side reactions such as isomerization to products of lower octane rating, etc., yet permits substantial secondary olefin reaction and therefore higher gallonage than prior methods using aqueous acid catalysts. The life of the catalyst in my process is exceptionally long, more than 195 volumes of hydrocarbon having been treated per volume of sulfuric acid without materially affecting the activity of the acid. Many variations may be introduced without departing from the spirit of my invention which is not to be regarded as limited to the details of operation disclosed nor by the soundness of the theories advanced in explanation of the improved results attained, but only by the terms of the accompanying claims in which it is my intention to claim all novelty inherent therein as broadly as possible in view of the prior art.

I claim as my invention:

1. A process for producing olefin polymers which comprises maintaining a hydrocarbon mixture containing different olefins of at least three carbon atoms at least one of which is a tertiary olefin in contact with an aqueous solution of a strong mineral acid of sulfur of 55 to 80% concentration at a polymerizing temperature of about 120° to about 70° C. until substantial conjunct polymerization between said olefins takes place.

2. A process for producing polymers from a hydrocarbon mixture containing tertiary and secondary olefins which comprises heating said hydrocarbons in the liquid phase with a 55 to 80% sulfuric acid solution at about 120° to 70° C. until substantial conjunct polymerization of tertiary olefin with secondary olefin takes place.

3. A process for producing polymers from a hydrocarbon mixture containing tertiary and secondary olefins which comprises contacting said hydrocarbons in the liquid phase with about 0.25 to about 2.5 mols of sulfuric acid per mol of olefin at about 70° to 120° C., the acid concentration being 80% to 55%, until substantial conjunct polymerization of tertiary olefin with secondary olefin takes place.

4. A process for producing octenes from isobutylene and secondary butylenes which comprises contacting said olefins with about 0.25 to about 2.5 mols of sulfuric acid at about 70° to 120° C., for a time between 1 minute and about 25 minutes, using an acid concentration within the range of about 55% to 80% which promotes substantial conjunct polymerization of isobutylene with secondary butylene under the reaction conditions.

5. In a process for producing anti-knock gasoline from tertiary and secondary olefins of not more than six carbon atoms per molecule the steps of contacting a mixture comprising said olefins and 55 to 80% sulfuric acid at a temperature of about 120° to 70° C. and maintaining said components in emulsified contact until substantial conjunct polymerization of tertiary olefin with secondary olefin takes place.

6. A process for producing olefin polymers which comprises contacting a tertiary olefin containing mixture containing at least one and not more than five mols of secondary olefin per mol of tertiary olefin with 55 to 80% sulfuric acid at 120° to 70° C. until substantial conjunct polymerization of tertiary olefin with secondary olefin takes place.

7. A process for producing olefin polymers which comprises contacting a mixture of tertiary and secondary olefins with 55 to 80% sulfuric acid at 120° to 70° C. in the presence of an effective amount of a substantially inert hydrocarbon until substantial conjunct polymerization of tertiary olefin with secondary olefin takes place.

8. A process for producing olefin polymers which comprises heating a hydrocarbon mixture containing tertiary and secondary olefins, contacting the heated hydrocarbon with 55 to 80% sulfuric acid and maintaining said hydrocarbon and acid in emulsified contact at about 120 to 70° C. until substantial conjunct polymerization of tertiary olefin with secondary olefin takes place.

9. A continuous process for polymerizing olefins which comprises continuously feeding heated hydrocarbon in the liquid phase containing tertiary and second olefins to an emulsifier with 55 to 80% sulfuric acid, maintaining said hydrocarbon and acid in emulsified contact at about 120° to 70° C. until substantial conjunct polymerization of tertiary olefin with secondary olefin takes place, separating polymers and acid from the reacted mixture and continuously returning the latter together with at least a part of the unreacted olefin recovered to the emulsifier for contact with further tertiary and secondary olefin containing hydrocarbon.

10. A process for producing octenes which comprises emulsifying a butane-butylene fraction containing isobutylene and an excess of secondary butylenes with 63 to 72% sulfuric acid at 105 to 80° C. for a time within the range of about 3 to 13 minutes sufficient for substantial conjunct polymerization of isobutylene with secondary butylenes, stratifying the reacted mixture, separating polymers produced and returning at least a part of the unreacted butylenes to contact with said acid and fresh butane-butylene fraction.

11. A process for producing octenes which comprises feeding an emulsified mixture of 63 to 72% sulfuric acid and hydrocarbons containing isobutylene and secondary butylenes to a packed column maintained at a temperature of from 105 to 80° C. at a rate at which substantial conjunct polymerization of isobutylene with secondary butylene takes place therein, separating the resulting polymers and returning the acid to the emulsifier.

SUMNER H. McALLISTER.